United States Patent Office 3,075,996
Patented Jan. 29, 196

3,075,996
BRIGHTENING AGENTS
Roderich Raue, Leverkusen, Germany, assignor to Farbenfabriken Bayer Aktiengesellschaft, Leverkusen, Germany, a corporation of Germany
No Drawing. Filed Jan. 11, 1960, Ser. No. 1,415
Claims priority, application Germany Jan. 16, 1959
5 Claims. (Cl. 260—343.2)

The present invention relates to brightening agents capable of improving the whiteness or color of materials of various kind.

It has been found that practically colorless, bluish fluorescent compounds of the coumarin-series corresponding to the general formula

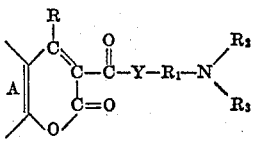

wherein A stands for a phenylene or naphthylene radical, R stands for hydrogen or a low molecular weight alkyl radical such as methyl, ethyl or propyl, and Y stands for O or NH, whereas $R_1$ represents an alkylene radical with preferably 2–4 carbon atoms and $R_2$ and $R_3$ stand for identical or different alkyl or aralkyl radicals, are valuable brightening agents for materials of the most varied type, particularly for materials of polyacrylonitrile or cellulose esters. The same applies to the quaternization products of the said compounds.

The phenylene radical of the compounds of the above general formula is preferably substituted, i.e. by the radicals —OH, —O-alkyl, —O-aralkyl, —$NH_2$, —NH-alkyl, —N-(alkyl)$_2$, —NHCO-alkyl, —NHCO-aryl, —NHCONH-alkyl or —NHCONH-aryl; but other substituents may also be present such as alkyl groups or halogen; the naphthylene radical can also be substituted in the same manner.

The brightening agents of the present invention can be prepared for instance by reacting—preferably at elevated temperature—coumarin-3-carboxylic acid compounds of the general formula

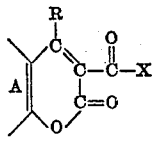

wherein A and R have the meaning indicated above, and X denotes a reactive radical, e.g. a free or esterified hydroxyl group or halogen, with amines of the general formula

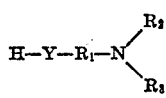

wherein Y, $R_1$, $R_2$ and $R_3$ have the meaning indicated above, and quaternizing the reaction products obtained, if desired.

Representatives of coumarin-3-carboxylic acid compounds are inter alia the methyl, ethyl, hydroxy-ethyl, propyl, butyl and phenyl esters of 7-hydroxy-coumarin-3-carboxylic acid, 7-methoxy-coumarin-3-carboxylic acid, 7-dimethylamino-coumarin-3-carboxylic acid, 7-acetyl-amino-coumarin-3-carboxylic acid, 5,6-benzocoumarin-3-carboxylic acid and of 7,8-benzocoumarin-3-carboxyl acid.

Examples of amines are the following compound 2-dimethylaminoethanol, 2-diethylamino ethanol, dimethylamino propanol, 4-dimethylamino butanol, amino-2-dimethylamino ethane, 1-amino-2-diethylami ethane, 1-amino-3-dimethylamino propane and 1-amin 3-diethylamino propane.

For quaternizing the reaction products, there may used in known manner for example dimethyl sulfa diethyl sulfate, methyl iodide, ethyl iodide, 4-toluene-s fonic acid methyl ester, 4-toluene-sulfonic acid ethyl es or benzyl chloride; the quaternization can also be c ried out by treating the reaction product in the reacti mixture with quaternizing agents without previous iso tion.

The brightening agents of the present invention c be applied in the usual manner, for instance in the fo of solutions in water or organic solvents or in the fo of aqueous dispersions; they can also be used in co bination with washing agents. Furthermore they c be added to spinning or casting masses which serve the production of artificial fibres, filaments, foils or otl shaped articles.

Compared with other compounds of the couma series which have already been applied for brighten materials of various type, the brightening agents of present invention are distinguished by their high brig ening strength.

The following examples serve to illustrate the inv tion without, however, limiting the scope thereof; parts given are by weight.

Example 1

Polyacrylonitrile fibres are introduced into an aque bath having a goods-to-liquor ratio of 1:40 and cont: ing per litre 1 g. of oxalic acid, 1 g. of sodium chlo and 0.05 g. of the brightening agent described bel The bath is then heated to the boil within 20 minutes kept at this temperature for 45–60 minutes. The p acrylonitrile fibres are subsequently rinsed and dr The fibres are brightened in an outstanding manner.

The brightening agent was prepared as follows: parts of 5,6-benzocoumarin-3-carboxylic acid ethyl e were treated with 125 parts of 3-dimethylamino-pro] amine and heated on a boiling water bath for 6 ho The melt was then rubbed with 1500 parts of water; resultant crystal slurry was added to 10,000 parts of w and, after stirring for two hours, filtered off with sucti The 5,6-benzocoumarin-3-carboxylic acid - 3' - dimetl amino-propyl amide thus obtained had a melting poin 122–124° C. after recrystallisation from cyclohexane.

110 parts of the 5,6-benzocoumarin-3-carboxylic a 3'-dimethyl-aminopropyl amide were heated with parts of acetone and treated dropwise with 50 parts ol methyl sulfate. After heating the reaction mixture to boil under reflux for a further 30 minutes, the cry slurry thus formed was filtered off with suction and crystallised from alcohol. The resultant quaternary melted at 215–218 ° C.

Instead of the brightening agent mentioned above of the brightening agents produced in the following n ner can be applied with the same good result: 536 p of 5,6-benzocoumarin-3-carboxylic acid ethyl ester \ slowly treated while stirring with 208 parts of 3-dimet aminopropyl amine, a homogenous brown-yellow r being formed whilst the temperature rose to 60° C. mediately when the temperature began to fall, the reac mixture was heated on a boiling water bath for two hc After the mixture was diluted with 2000 parts of acet 284 parts of methyl iodide, 312 parts of ethyl iodide, arts of diethyl sulfate, 372 parts of 4-toluene-sulfonic acid methyl ester or 400 parts of 4-toluene-sulfonic acid ethyl ester were added dropwise with stirring in such a manner that the solution continuously boiled under reflux. The reaction mixture was boiled under reflux for another three hours, then cooled and the separated crystal slurry was finally filtered off with suction.

The melting points of the quaternary salts obtained in this manner are listed in the following table.

| Quaternizing agent | Quaternary salt recrystallized from— | Melting point of the quaternary salt, °C. |
|---|---|---|
| methyl iodide | methanol and water | 252–254 |
| ethyl iodide | do | 254–255 |
| methyl sulfate | methanol | 215–218 |
| 4-toluene-sulfonic acid methyl ester | do | 190–193 |
| 4-toluene-sulfonic acid ethyl ester | ethanol | 180–181 |

Example 2

A stock solution is prepared from 10 parts of one of the quaternary salts described in Example 1, 10 parts of polyacrylonitrile and 80 parts of dimethyl formamide; this solution is then added to a customary polyacrylonitrile spinning solution in a quantity so that the concentration of the quaternary salt in the spun polyacrylonirile material amounts to 0.15 percent by weight. The spinning solution is then spun in conventional manner, and the resultant fibre material is bleached in a bath containing sodium chlorite. The whitening effect thus obtained is excellent.

Example 3

Cellulose acetate fibres are introduced at 30–70° C. for 20–30 minutes into an aqueous bath having a goods-to-liquor ratio of 1:30 and containing per litre 0.03 g. of the brightening agent described below. The fibres are subsequently rinsed and dried; they then show a very good brightening effect.

The brightening agent was prepared as follows: 268 parts of 5,6-benzocoumarin-3-carboxylic acid ethyl ester and 206 parts of 3-dimethylamino propanol were stirred for 6 hours on a boiling water bath. The excess of 3-dimethylamino propanol and the ethanol formed were then distilled off on a boiling water bath under vacuum. The residue was dissolved in 800 parts of acetone, and 126 parts of dimethyl sulfate were then added dropwise to the solution, the temperature thus rising to approximately 40° C. After heating the solution to the boil under reflux for a further 2 hours, it was cooled; the crystalline reaction product thus formed was filtered off with suction and recrystallised from methanol. The melting point of the resultant quaternary salt lay at 204–210° C.

Instead of the brightening agent described above one of the brightening agents can be used with the same good result which were prepared by applying in the reaction procedure 2-dimethylamino ethanol or 2-diethylamino ethanol instead of 3-dimethylamino propanol whereby the corresponding quaternary salts of the melting points 282° C. and 235° C. were obtained.

Example 4

In the manner described in Example 1 polyacrylonitrile fibres are treated with one of the two brightening agents mentioned below. The brightening effect thus obtained is excellent.

One of the brightening agents was prepared as follows: 268 parts of 5,6-benzocoumarin-3-carboxylic acid ethyl ester were treated with 104 parts of 3-dimethylamino propyl amine, the temperature rising to 50° C. The mixture was then heated to 100° C. and stirred on a boiling water bath for 2 hours. The dark-coloured melt was diluted with 1000 parts of toluene and subsequently treated with 127 parts of benzyl chloride. The mixture was again heated to 100° C. and stirred on a boiling water bath for 20 hours. After the mixture was cooled, the separated crystalline reaction product was filtered off with suction and recrystallised from alcohol, the crystallisation being accelerated by the addition of a little ether. The resultant quaternary salt melted at 229–230° C.

The other brightening agent was prepared in the following manner: 268 parts of 5,6-benzocoumarin-3-carboxylic acid ethyl ester were heated to 100° C. with 137 parts of 3-diethylaminopropyl amine, and the mixture was kept at this temperature for 2 hours. The mixture was then diluted with 1000 parts of acetone, and 126 parts of dimethyl sulfate were added dropwise; the temperature thus rose to approximately 60° C. After boiling the reaction mixture under reflux for another 3 hours, it was cooled and allowed to stand at about 0° C. for 12 hours. The separated crystals were then filtered off with suction, washed with acetone and recrystallised from 700 parts of alcohol. The resultant quaternary salt melted at 134–140° C.

Example 5

In the manner described in Example 3 cellulose acetate fibres are treated with one of the two brightening agents mentioned below. The fibres are then very well brightened.

One of the brightening agents was prepared as follows: 67 parts of 7-hydroxy-coumarin-3-carboxylic acid ethyl ester were treated with 30 parts of 3-dimethylaminopropyl amine and heated on a boiling water bath for 2 hours. After the addition of 200 parts of acetone, 36 parts of dimethyl sulfate were added dropwise to the solution. The temperature rose to approximately 60° C. and a crystalline precipitate was formed. The reaction mixture was heated to the boil under reflux for another 3 hours, the precipitate was then filtered off with suction, washed with acetone and recrystallised from a mixture of 150 parts of methanol and 50 parts of water. The resultant quaternary salt melted at 238–247° C.

The other brightening agent was prepared in the following manner: 32 parts of 7-dimethylamino-coumarin-3-carboxylic acid ethyl ester were treated with 13 parts of 3-dimethylaminopropyl amine, and the mixture was stirred on a boiling water bath for 2 hours. The melt was then diluted with 150 parts of acetone and 16 parts of dimethyl sulfate were added dropwise. After the reaction mixture was heated under reflux for another 3 hours, the precipitate formed was filtered off with suction, washed with acetone and recrystallised from methanol. The resultant quaternary salt had a melting point of 265–267° C.

I claim:
1. A quaternized compound of the formula

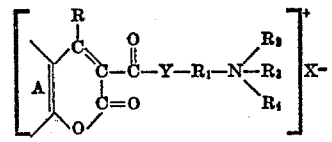

wherein
A is a member of the group consisting of phenylene, hydroxyphenylene, methoxyphenylene, dimethylaminophenylene, acetylaminophenylene and naphthylene;
R is a member of the group consisting of hydrogen and low molecular weight alkyl;
Y is a member of the group consisting of O and NH;
$R_1$ is alkylene having up to 4 carbon atoms;
$R_2$ and $R_3$ are each lower alkyl; and
the quaternizing agent is a member selected from the group consisting of dimethyl sulfate, diethyl sulfate, methyl iodide, ethyl iodide, 4-toluene-sulfonic acid methyl ester, 4-toluene-sulfonic acid ethyl ester and benzyl chloride to provide $R_4$ and X.

2. A compound of the formula
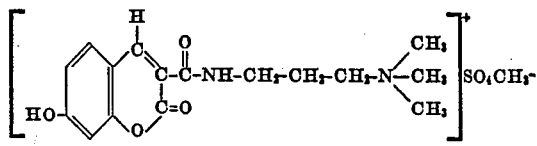
3. A compound of the formula
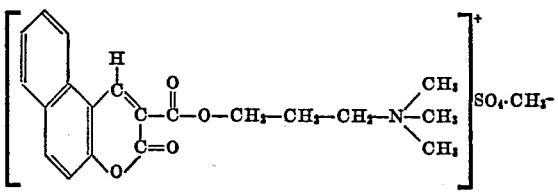
4. A compound of the formula
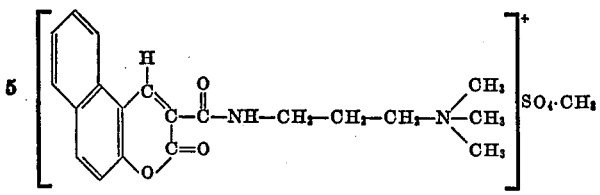
5. A compound of the formula
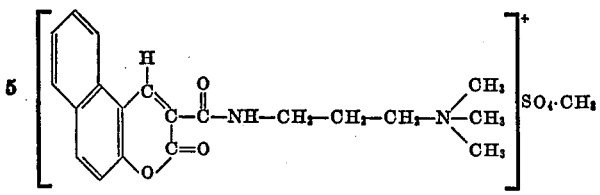
References Cited in the file of this patent
Landolt: Amer. Dyestuff Reporter (1949), pages 353 356.